Sept. 18, 1962

F. K. BUELOW

INVERTING CIRCUIT EMPLOYING A NEGATIVE RESISTANCE DEVICE

Filed Aug. 25, 1959

3,054,911

INVENTOR
FRED K. BUELOW

BY Arthur S. Tenser

ATTORNEY

United States Patent Office 3,054,911
Patented Sept. 18, 1962

3,054,911

INVERTING CIRCUIT EMPLOYING A NEGATIVE RESISTANCE DEVICE

Fred K. Buelow, Wappingers Falls, N.Y., assignor to International Business Machines Corporation, New York, N.Y., a corporation of New York Filed Aug. 25, 1959, Ser. No. 835,943
10 Claims. (Cl. 307—88.5)

This invention relates to logical circuitry, and more particularly to a signal inverting logical block operating at extremely high speeds.

Circuit development in the digital computer field is becoming increasingly directed towards the problem of speed. As logical techniques and programming theories advance, increases in operating speeds of the machine itself are required to render operation of the computer more versatile and less expensive. The quest for increased speed narrows itself down to the basic logical blocks out of which the machines are fabricated. Any speed increase achieved at this level is multiplied innumerable times when extrapolated over the entire machine organization.

Many present day computers are practically all solid state, most of the active elements being of the semiconductor or magnetic core type. Transistors and diodes are used to provide the switching elements required in the logical circuitry of the machine, while magnetic cores are more generally used for storage and memory purposes. The transistor, when used as a switch, as is the case in logical circuitry, suffers from internal speed limitations. For example, in a junction transistor a finite time is required for minority carriers to cross the base region and start collector current flow once the emitter-base diode is forward biassed. The same problem occurs in reverse when the transistor is subsequently biased into non-conduction; it takes a finite time for the minority carriers already in the base region to be "cleaned up." Attempts to reduce these turn-on and turn-off delays have followed two avenues: The internal make-up of the transistor has been varied in an attempt to reduce the transit time through the base region, and other efforts have been devoted toward modifying external circuitry to prevent or compensate for this delay. The present invention is in the latter area and enables presently available transistors to be used in logical blocks operating at speeds heretofore not achieved.

Accordingly, it is the primary object of this invention to provide a basic logical block which performs its logical function at an extremely high rate of speed.

A further object of this invention is to provide a solid state inverter circuit operating at speeds heretofore not attained.

An additional object of this invention is to provide novel means for performing both a logical function and a signal inversion in the same circuit.

Still another object of this invention is to provide a novel circuit performing the NOT-OR logical function.

Yet another object of this invention is to provide a novel circuit for performing the NOT-AND logical function.

Briefly, this invention comprises a transistor connected in an emitter-follower or common collector configuration with a negative resistance device in its emitter circuit. A fixed load impedance is also connected in the emitter circuit. The transistor is continuously biassed in its conducting region, conducting lightly in one condition of its input signal and more heavily in the other. The fixed load impedance is so chosen that the load lines at the operating extremes of the transistor will be just beyond the ends of the negative resistance portion of the characteristic of the negative resistance element. Thus, when the transistor is in its lightly conducting state, the voltage drop across the negative resistance element is small and that across the fixed impedance element is large. The opposite voltage division takes place in the heavily conducting state. By properly combining transistor conductivity type with polarization of the negative resistance device, inverters can be produced. Additionally, by paralleling the transistors and tying their emitters in common, additional logical functions may be performed.

The foregoing and other objects, features, and advantages of the invention will be apparent from the following more particular description of preferred embodiments of the invention as illustrated in the accompanying drawings.

Figure 1:
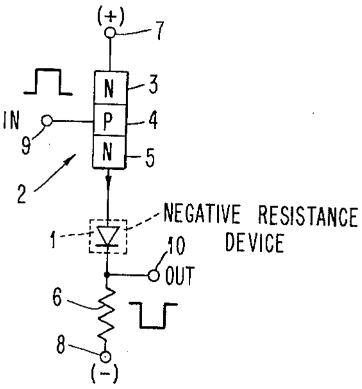
FIGURE 1 is a circuit diagram of an inverting circuit according to the invention using an NPN junction transistor.

In FIGURE 1 is shown a basic inverter circuit according to the invention. Negative resistance device 1 is connected in the emitter circuit of transistor 2, shown as being of the NPN junction type having an emitter 5, base 4, and collector 3. Also connected to the negative resistance device is a fixed resistance 6; the transistor, the negative resistance device, and the resistance 6 forming a series circuit. The collector 3 of the transistor is returned to positive voltage source 7 while the lower end of resistance 6 is tied to negative potential 8. Signal input is provided to the base of the transistor 2 at terminal 9 and the output is taken from terminal 10 across the resistance 6.

Figure 3:
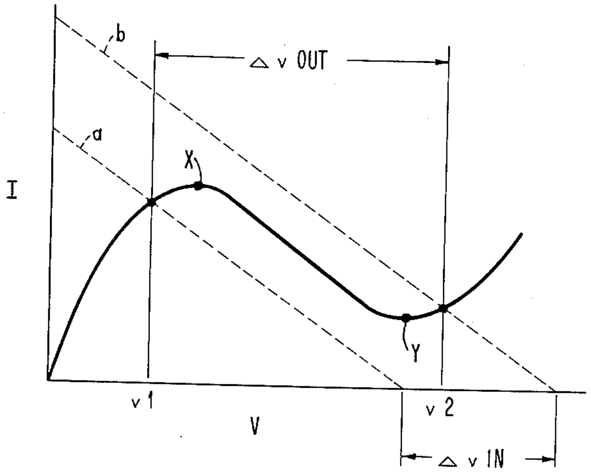
FIGURE 3 is a plot showing the negative resistance characteristic of one of the elements used in the invention.

The current versus voltage characteristic of the negative resistance device used in the circuit of FIGURE 1 is shown in FIGURE 3 and includes a negative resistance portion between the points X and Y. As is apparent therefrom, if the voltage applied to the device is increased through its region of negative slope, the current through the device decreases. If in one condition the circuit in which the device is used has impedance and voltage values such that the load line is as shown by *a*, the voltage drop across the device will be $v_1$. An increase in applied voltage $\Delta v_{in}$, will shift the load line to line *b*. The load line now intersects the characteristic at voltage $v_2$, and the change in voltage across the device is shown as $\Delta v_{out}$. This voltage is considerably greater than the change in input voltage and therefore the device exhibits voltage amplification. One such device which exhibits this characteristic is known as the Esaki or tunnel diode. This device is a heavily doped junction diode and is therefore extremely compatible for use in transistor circuits. The negative resistance characteristic is present in its forward conducting direction, the positive or anode electrode being the input terminal and the output being taken at its cathode or negative electrode. A more detailed description of this device may be found in an article by Leo Esaki appearing in the Physical Review for January 15, 1958, entitled: "New Phenomenon in Narrow Germanium P-N Junctions." It will be realized of course, that any type of device exhibiting the negative resistance characteristic required by the circuit will be suitable.

The transistor 2 of the circuit of FIGURE 1 is always in a conductive state. The input signal levels are such that the transistor will be in a lightly conducting state when the signal is in its more negative level and in a highly conducting state when the input signal goes to its more positive level. The voltage across the negative resistance device is thus dependent upon the positive voltage 7, the voltage drop across the transistor 2, the voltage drop across the impedance 6, and the value of negative voltage source 8. When the input signal is at its negative level, the transistor 2 is at the higher of its two impedance levels. By proper choice of the magnitude of voltage sources 7 and 8, and the size of resistance 6, the circuit at this condition can be so proportioned that the voltage existing at the upper, or input terminal of the negative resistance device will be such as to establish it at a condition equivalent to load line *a* of FIGURE 3. When the input signal goes positive, the impedance of transistor 2 decreases, raising the voltage at its emitter and thus at the input terminal of the negative resistance device. This increase in voltage, equivalent to $\Delta v_{in}$ of FIGURE 3, produces the voltage amplification across the device 1, $\Delta v_{out}$. The voltage across the fixed impedance 6, therefore must decrease since less current is now flowing through the negative resistance device and into the fixed impedance. The voltage at output terminal 10 therefore drops, giving the inversion desired. At the drop in input signal, the voltage on the device 1 decreases, thereby increasing current flow through the device and the fixed impedance to raise the potential at terminal 10.

It will be recognized that the above described circuit is basically the common collector or emitter-follower configuration. This type of circuit presents an extremely attractive switching arrangement since the delay between output and input signals is occasioned only by the switching time of the base-emitter diode of the transistor, which is considerably shorter than the switching time of the collector-base diode. The latter causes the turn-on delay in the common-emitter circuit configuration. Additionally, because of the power gain of the emitter-follower configuration, both the logical function and power driving may be accomplished in the same stage. By introducing the negative resistance device in the emitter circuit of the transistor, the stage is permitted to provide the inversion function which is required to complete any logical system. Since a device such as the Esaki or tunnel diode is a very fast switching device, the total switching time of the resultant inverter is considerably less than that of the common-emitter type of transistor inverter. It will be realized of course, that if power gain is of no concern, any sufficiently low impedance input circuit may be used in place of the emitter-follower to complete the inverter.

Figure 2:
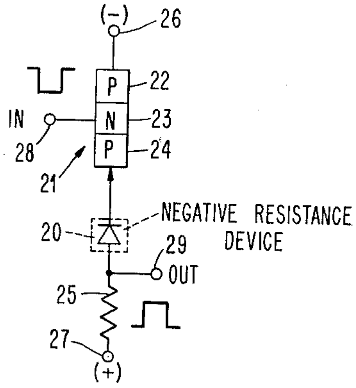
FIGURE 2 illustrates a circuit according to the invention using a PNP junction transistor.

In FIGURE 2 is shown an inverter circuit according to the invention using a PNP transistor 21, as opposed to the NPN transistor 2 of FIGURE 1. The transistor, having an emitter 24, base 23, and collector 22, has its emitter connected to the negative resistance device 20, which may be of the same type as that of FIGURE 1. It is noted, however, that the polarity of this device is reversed from that of FIGURE 1. This reversal of connection is required by the characteristic of the PNP transistor so that the current flow through the negative resistance device will be in the proper direction to utilize its negative resistance characteristic. The other side of device 20 is connected to one terminal of resistor 25 whose other terminal is tied to positive voltage source 27. Negative voltage source 26 provides collector bias for the transistor 21. Input signals are applied from terminal 28 to the base 23 of the transistor and the output is taken at terminal 29 connected to the junction of the fixed impedance 25 and the negative resistance device 20. It is seen that except for the transistor type, which reverses the direction of current flow, and the polarity of the negative resistance device, the circuit is essentially similar to that of FIGURE 1. Thus, as the input signal goes negative to render the transistor 21 more conductive, the voltage drop across the device 20 decreases, thereby increasing the potential at terminal 29. This operation is merely the inverse of that of FIGURE 1.

Figure 4:
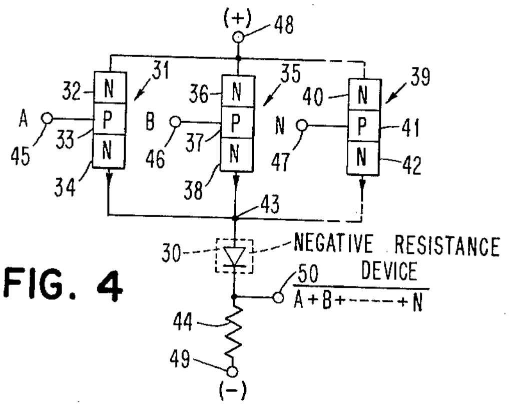
FIGURE 4 is a diagram of a logical circuit utilizing the principles of this invention.

Referring now to FIGURE 4, there is shown an extension of the circuit of FIGURE 1 where a logical OR function is achieved in addition to the inversion function to produce a logical stage providing a NOT-OR output. The circuit comprises transistors 31, 35, and 39, shown as being of the NPN junction type. Although three transistors are shown, the dotted line between transistors 35 and 39 indicate that any number of such transistors may be paralleled to provide an N way circuit. Transistor 31 has its collector 32, base 33, and emitter 34. Similar elements are shown at 36, 37, 38, of transistor 35 and at 40, 41, and 42 of transistor 39. The emitters are all connected to junction point 43 to which is also coupled the negative resistance device 30. Fixed impedance 44 is connected between the negative resistance device 30 and a source of negative potential 49. Positive potential source 48 provides collector bias for all the transistors. Input signals to the bases of transistors 31, 35, and 39, are provided at terminals 45, 46 and 47, respectively. The output is derived at terminal 50 connected to the junction of device 30 and impedance 44.

Disregarding the negative resistance device 30 for a moment, it will be seen that the transistor arrangement operates as a simple OR circuit. With a positive input signal provided to one or more of the terminals 45, 46, and 47, the respective transistor or transistors will be rendered highly conductive, thereby raising the potential at the emitter point 43. Now, the negative resistance device 30 and fixed impedance 44 operate with respect to this potential in the same manner as in the circuit of FIGURE 1. The voltage drop across the device 30 increases with the increase in potential at point 43, thereby decreasing the potential across the resistance 44. This inverts the OR function accomplished by the transistors to give an output at terminal 50 which is a NOT-OR function, expressed in Boolean algebra notation as $\overline{A+B+\text{---}+N}$. Thus, by using the basic inverter teaching in combination with a simple logical network, a circuit producing an N way logical function is derived operating at a speed considerably greater than others performing the same logical function.

Figure 5:
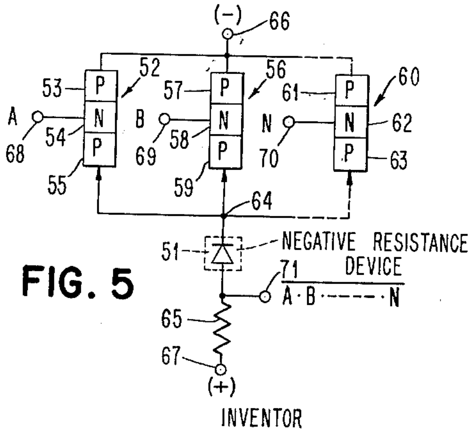
FIGURE 5 illustrates another logical network according to the invention.

In FIGURE 5 is shown an application of the principle of this invention to perform the NOT-AND function. The circuit comprises three PNP junction transistors, 52, 56, and 60, having their respective emitters 55, 59, and 63, connected to a common terminal 64. Negative resistance device 51 is also connected to the junction 64. Fixed impedance 65 connects the device 51 to a source of positive potential 67. Bias for the collectors 53, 57, and 61, of the transistors is provided by negative potential source 66. The three transistors are shown having input A, B, and N, connected to their respective bases 54, 58, and 62. The dotted lines between the collectors and emitters of transistors 56 and 60 and the N input to the base of transistor 60 indicate that more than three transistors may be paralleled to form an N way circuit. The output of the circuit is taken from terminal 71 at the junction of negative resistance device 51 and fixed impedance element 65.

Considering the paralleled transistors alone, it will be seen that the connection thereof provides a simple AND logical function. The terminal 64 will be at its more positive potential level only if all of the inputs to the transistors are at their more positive level, thereby rendering all of the transistors non-conductive. Should one or more of the inputs go negative, the emitter of the respective transistor, and thus the junction point 64, will also go negative. The connection of elements 51 and 65 are identical to the elements 20 and 25 of FIGURE 2 and function in the same manner to invert the potential appearing at point 64. Thus the output taken at terminal 71 is the inverted AND function or the NOT-AND function, $\overline{A\cdot B\cdot\ .\ .\ .\ .\ \cdot N}$. As in the case of the NOT- OR circuit of FIGURE 4, the NOT-AND circuit of FIGURE 5 combines the rapid switching feature of the emitter-follower configuration with the rapid inversion of the negative resistance device to produce a circuit performing a logical function and an inversion at an extremely rapid rate.

By using the negative resistance device in an emitter-follower transistor configuration, a circuit has been derived which produces a signal inversion at a speed not heretofore attained in transistor circuitry. This technique may be extended to produce logical elements of sufficient versatility to permit fabrication of entire computing machines. For example, by cross-coupling outputs and inputs of two inverters of the type shown in either FIG. 1 or FIG. 2, a trigger circuit is formed. Additionally, where necessary, in phase outputs may be taken at the emitter of the transistor. While junction transistors have been shown, it is to be realized that other types of switching devices may be combined with a negative resistance device to produce a similar effect. Likewise, although the Esaki or tunnel diode has been described as being a preferred type of device for the negative resistance element of the invention, it is to be understood that other devices exhibiting the requisite negative resistance characteristic may be used in its place and that these devices may be combined with other types of AND and OR circuits to provide the NOT-AND and NOT-OR functions.

While the invention has been particularly shown and described with reference to preferred embodiments thereof, it will be understood by those skilled in the art that various changes in form and details may be made therein without departing from the spirit and scope of the invention.

What is claimed is:

1. A high speed phase inverting circuit comprising, a transistor, having an emitter, a base and a collector connected in a common collector configuration, a load impedance connected in circuit with said emitter across which an output is taken, and a negative resistance device connected in series with said load impedance and said emitter whereby the voltage across said load impedance varies inversely with the voltage in said emitter circuit.

2. A high speed inverter circuit comprising a transistor having emitter, base, and collector elements, a two terminal device having a volt-ampere characteristic with a negative resistance portion between two positive resistance portions, one terminal of said device being connected to the emitter element of said transistor, a fixed impedance having one terminal connected to the other terminal of said device, a unidirectional voltage source connected between said collector element and the other terminal of said fixed resistance, means to supply a signal to said base element to vary the impedance of said transistor to shift the operation of said device from a point in one of said positive resistance portions to a point in the other of said positive resistance portions, and means to derive an output across said fixed impedance.

3. In combination with a logical circuit whose output varies between one voltage level during performance of its intended logical function and another voltage level during non-performance of said function, a circuit device exhibiting tunnelling phenomena and having a volt-ampere characteristic with a negative resistance portion between two positive resistance portions whereby a voltage amplification is provided, means connecting the output of said logical circuit to one terminal of said device to shift the operation of said device between a point on one of said positive resistance portions and a point on the other of said positive resistance portions in response to said one and said other voltage level outputs respectively of said logical circuits, means connecting the output of said device through an impedance to a voltage source, and means deriving an output across said impedance.

4. A signal switching and inverting circuit comprising, a plurality of signal responsive variable impedances connected between a source of potential and a common junction, a second source of potential, a fixed impedance and a negative resistance device connected in series between said second potential source and said junction, and an output terminal coupled to the connection between said impedance and said device.

5. A high speed logical circuit comprising a plurality of transistors, each connected in an emitter follower configuration, a separate input for each of said transistors, a device having a volt-ampere characteristic with a negative resistance portion, means connecting the outputs of each of said transistors to one terminal of said device, an impedance element connected between another terminal of said device and a source of fixed potential, and means for deriving an output across said impedance.

6. The circuit of claim 5 above wherein said transistors are connected to perform an OR logical function.

7. The circuit of claim 5 above wherein said transistors are connected to perform an AND logical function.

8. A voltage switching circuit comprising, a two terminal circuit element exhibiting tunnelling phenomena and having a volt-ampere characteristic with a negative resistance region between two positive resistance regions, a source of direct voltage having two terminals, impedance means coupling one terminal of said direct voltage source to one terminal of said circuit element, a source of input signals varying between first and second voltage levels, means coupling the other terminal of said direct voltage source and said input signal source to the other terminal of said circuit element, said impedance means and said direct voltage source being proportioned to provide a load line for said circuit element intersecting its volt-ampere characteristic at a single point which is in one positive resistance region at said first voltage level of input signal and at a single point which is in the other positive resistance region at said second voltage level of input signal, and output means coupled across said impedance means.

9. A switching circuit comprising, a two terminal semiconductive circuit element with a volt-ampere characteristic in its forward conducting direction having a negative resistance region between two positive resistance regions and exhibiting tunnelling phenomena, a source of direct voltage having two terminals, load impedance means coupling one terminal of said direct voltage source to one terminal of said circuit element, a source of input signals varying between first and second voltage levels, means coupling the other terminal of said direct voltage source and said input signal source to the other terminal of said circuit element, said load impedance means and said direct voltage source being proportioned to provide a load line for said circuit element which intersects its volt-ampere characteristic at a single point in one positive resistance region at said first voltage level of input signal and at a single point in the other positive resistance region at said second voltage level of input signal, and output means coupled to one terminal of said circuit element.

10. The apparatus of claim 9 above wherein said circuit element comprises an Esaki diode.

References Cited in the file of this patent

UNITED STATES PATENTS

| | | |
|---|---|---|
| 2,901,638 | Huang | Aug. 25, 1959 |
| 2,903,603 | Glenn | Sept. 8, 1959 |
| 2,908,871 | McKay | Oct. 13, 1959 |

OTHER REFERENCES

"Digital Computer Components and Circuits," Richards, Van Nostrand, November 1957, pages 137–144.

"Pulse Count Circuit," Stewart, RCA Technical Notes No. 260, June 1959.

Electronic Design, July 22, 1959, page 85.